United States Patent
Gotfried

(10) Patent No.: US 6,697,732 B1
(45) Date of Patent: Feb. 24, 2004

(54) AUTOMATIC SYSTEM FOR PROVIDING ASSISTANCE TO IMPAIRED DRIVERS

(76) Inventor: Bradley L. Gotfried, 8949 SE. Bridge Rd., Hobe Sound, FL (US) 33455

( * ) Notice: Subject to any disclaimer, the term of this patent is extended or adjusted under 35 U.S.C. 154(b) by 0 days.

(21) Appl. No.: 10/284,005

(22) Filed: Oct. 30, 2002

(51) Int. Cl.[7] .............................................. G01C 21/00
(52) U.S. Cl. ........................... 701/207; 701/29; 701/36; 701/201; 701/1; 382/124; 340/988; 180/272; 455/404.2; 455/99
(58) Field of Search .............................. 701/1, 29, 201, 701/207, 209, 36; 382/124, 115; 340/933, 425.5, 988; 180/272; 455/404.1, 404.2, 99, 91

(56) References Cited

U.S. PATENT DOCUMENTS

| | | | |
|---|---|---|---|
| 4,665,385 A | * 5/1987 | Henderson | 340/539.26 |
| 4,678,057 A | 7/1987 | Elfman et al. | 180/272 |
| 4,738,333 A | 4/1988 | Collier et al. | 180/272 |
| 5,189,395 A | 2/1993 | Mitchell | 340/539 |
| 5,365,516 A | 11/1994 | Jandrell | 370/18 |
| 5,743,349 A | 4/1998 | Steinberg | 180/272 |
| 5,825,283 A | * 10/1998 | Camhi | 340/438 |
| 5,876,926 A | 3/1999 | Beecham | 435/5 |
| 6,028,537 A | 2/2000 | Suman et al. | 340/988 |
| 6,064,970 A | * 5/2000 | McMillan et al. | 705/4 |
| 6,167,255 A | 12/2000 | Kennedy, III et al. | 455/414 |
| 6,198,996 B1 | 3/2001 | Berstis | 701/36 |
| 6,229,908 B1 | * 5/2001 | Edmonds et al. | 382/124 |
| 6,276,686 B1 | 8/2001 | Chille | 273/243 |
| 6,324,393 B1 | * 11/2001 | Doshay | 455/404.2 |
| 2001/0034220 A1 | 10/2001 | Berstis | 455/186.1 |
| 2003/0136600 A1 | * 7/2003 | Breed et al. | 180/272 |

* cited by examiner

*Primary Examiner*—Thomas G. Black
*Assistant Examiner*—Ronnie Mancho
(74) *Attorney, Agent, or Firm*—Akerman Senterfitt

(57) ABSTRACT

A system for providing assistance to impaired drivers including a substance detector for generating an impairment reading for a user based on a sample provided by the user and a notification device in communication with a transportation service in which the notification device contacts the transportation service when the impairment reading is outside a predetermined range. The notification device also provides the transportation service with navigational data when the notification device contacts the transportation service to permit the transportation service to locate the user. Additionally, a method for providing assistance to impaired drivers includes the steps of generating an impairment reading for a user based on a sample provided by the user and contacting a transportation service based on the impairment reading and providing the transportation service with navigational data to permit the transportation service to locate the user.

19 Claims, 6 Drawing Sheets

AUTOMATIC SYSTEM FOR PROVIDING ASSISTANCE TO IMPAIRED DRIVERS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present system relates to systems for preventing impaired driving and more particularly, to systems that prevent impaired persons from operating vehicles.

2. Description of Related Art

Driving a vehicle while impaired by drugs or alcohol is a major problem in the United States and many other countries. Each year, many deaths and injuries are attributable to alcohol or drug related vehicular accidents. In response, many jurisdictions in the United States, law enforcement officers have enacted reactive measures to curtail the occurrence of people driving while under the influence of drugs or alcohol. One example of a reactive measure used by law enforcement agencies is the administration of field sobriety tests to drivers who are suspected of driving under the influence of drugs or alcohol. Although such a reactive measure may remove a few individuals from roads or highways, this measure only controls those individuals who are stopped and concluded to be impaired by drugs or alcohol. Even then, the impaired drivers who are stopped have already risked the safety of the themselves and others by driving a vehicle.

A number of other measures directed at limiting the effects of impaired driving have been advanced. Some of these measures are more proactive in nature in that efforts are made to prevent a drunk or high driver from even getting in his or her car. For example, friends of an impaired driver may keep the driver's keys away from the driver if they believe that he or she is incapable of driving. Although safer than relying on law enforcement to remove the driver from the road, keeping the driver's keys may cause logistical problems because someone must provide the impaired individual with a ride home. In addition, the driver's car is often left unattended, which increases the chances of it being stolen or vandalized. Even worse, the impaired driver may be out alone without a support group to prevent him or her from driving. Thus, what is needed is a system that prevents impaired drivers from driving yet provides the driver with logistical alternatives to ensure his or her (or his or her car) safe passage home.

SUMMARY OF THE INVENTION

The present invention concerns a system for providing assistance to impaired drivers. The system includes a substance detector for generating an impairment reading for user based on a sample provided by the user and a notification device in communication with a transportation service where the notification device contacts the transportation service when the impairment reading is outside a predetermined range. The notification device also provides the transportation service with navigational data when the notification device contacts the transportation service to permit the transportation service to locate the user. Additionally, the impairment reading can be a blood alcohol content reading.

In one embodiment, the system can include an ignition disabling device in which the ignition disabling device can enable an ignition system when the impairment reading is inside the predetermined range. The system can also include a key blocking device. The key blocking device can provide access to a key when the impairment reading is inside the predetermined range.

In another embodiment, the notification device can include a global positioning system receiver for providing the navigational data to the transportation service and a transceiver for communicating with the transportation service. Additionally, the notification device can contact at least one of a governmental agency and an insurance agency when the impairment reading is outside the predetermined range.

The transportation service can provide the user with transportation once the transportation service locates the user. In one arrangement, the notification device can provide the transportation service with identifying information, and the transportation service can automatically charge a fee to an account. In another arrangement, the system can be contained within a vehicle driven by the user; the transportation service can locate the user by locating the vehicle, and the transportation service can provide transportation to the vehicle. In this system, the notification device can provide the transportation service with identifying information, and the transportation service can automatically charge a fee to an account. Also, the transportation service can include at least one of a driving service and a towing service. The system can also include a user interface where the user interface displays at least one of operating information and the impairment reading.

In accordance with the invention, a method for providing assistance to impaired drivers includes the steps of generating an impairment reading for a user based on a sample provided by the user, contacting a transportation service when the impairment reading is outside a predetermined range, providing the transportation service with navigational data during the contacting step to permit the transportation service to locate the user. The method can also include the step of providing transportation to at least one of the user and a vehicle driven by the user.

In the generating step, the impairment reading can be a blood alcohol content reading. The method can further include the step of providing an ignition disabling device and enabling an ignition system with the ignition disabling device when the impairment reading is within a predetermined range. Additionally, the method can also include the step of providing a key blocking device and enabling a key with the key blocking device when the impairment reading is within a predetermined range.

The contacting step can also include the step of contacting at least one of a governmental agency and an insurance agency when the impairment reading is outside a predetermined range. The providing step can also further include the step providing the transportation service with identifying information where the transportation service automatically charges a fee to an account.

BRIEF DESCRIPTION OF THE DRAWINGS

The invention may be better understood by referring to the following description taken in conjunction with the accompanying drawings, it being understood, however, that the invention is not limited to the precise arrangements and instrumentalities shown.

DETAILED DESCRIPTION OF THE PREFERRED EMBODIMENTS

Figure 1:
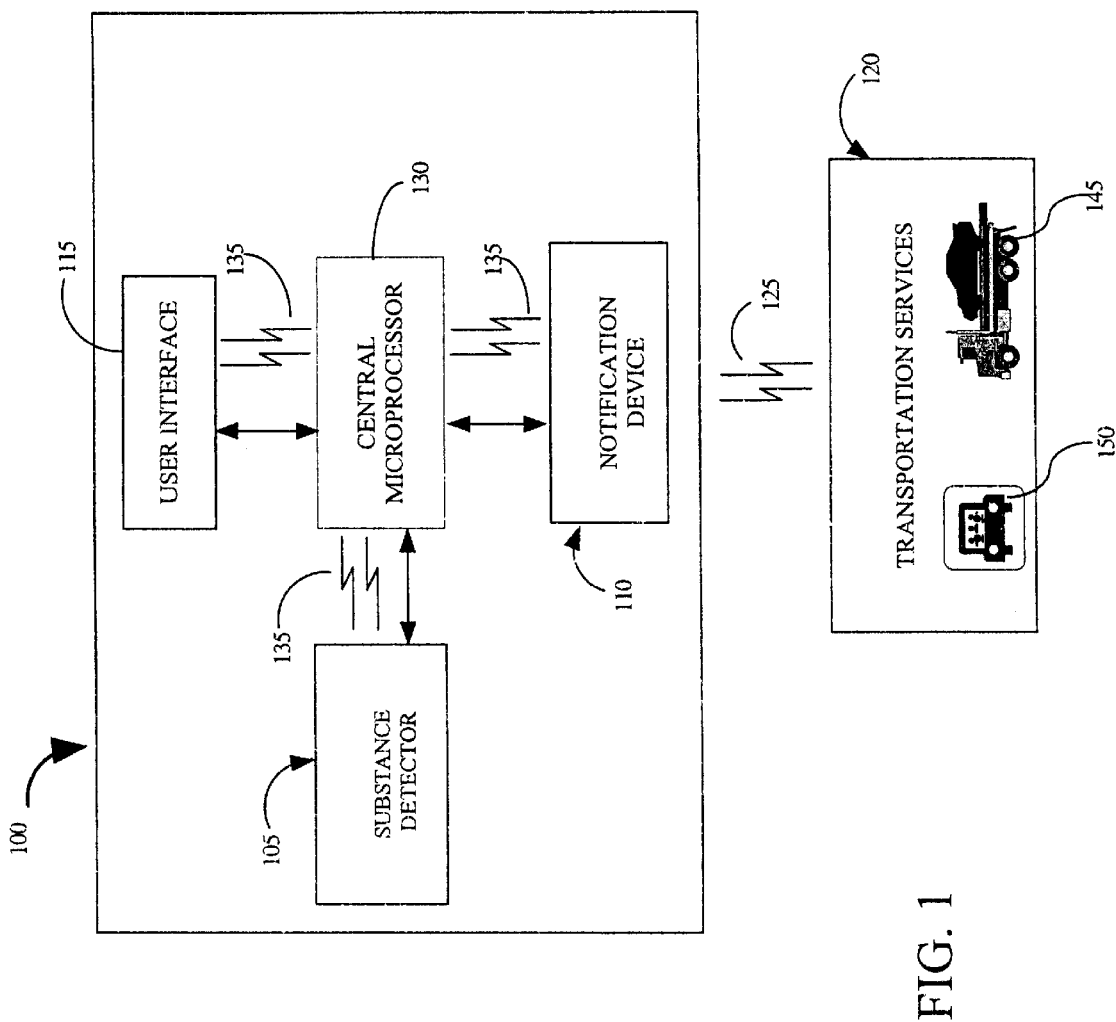
FIG. 1 illustrates a system for providing assistance to impaired drivers in accordance with the inventive arrangements.

Referring to FIG. 1, a system 100 for providing assistance to impaired drivers in accordance with the inventive arrangements is shown. The system 100 can include a substance detector 105, a notification device 110, and a user interface 115. The substance detector 105 can generate an impairment reading for a user based on a sample provided by the user. In one example, the user interface 115 can display the impairment reading or other operating information. The notification device 110, which can include suitable circuitry for using a wireless communication link 125 (discussed later), can be in communication with a transportation service 120. In addition, when the impairment reading is outside a predetermined range, the notification device 110 can contact the transportation service 120 over the wireless communication link 125 and can provide navigational data to the transportation service 120 to permit the transportation service 120 to locate the system 100 and, therefore, the user. It should be noted, however, that the notification device 110 can also contact the transportation service 120 based on any other suitable event that is not necessarily based on the impairment reading.

In one embodiment, the impairment reading can be a blood alcohol content reading; however, the invention is not limited in this regard as the impairment reading can be based on the presence or concentration of a variety of substances ingested by the user. For purposes of this invention, substances ingested by a user that can cause the substance detector 105 to generate an impairment reading can include any substance that a user brings into his or her body by inhalation, oral consumption, transdermal absorption, intravenous injection, or by any other method.

The system 100 can also include a central microprocessor 130 with control and data interfaces that can be coupled to the substance detector 105, the notification device 110, and the user interface 115. Through these control and data interfaces, the central microprocessor 130 can control the operation of the substance detector 105, the notification device 110, and the user interface 115. Additionally, the central microprocessor 130 can be provided with suitable software or firmware in memory for conventional operations and program routines can also be provided for the central microprocessor 130 in accordance with the inventive arrangements.

In another arrangement, the central microprocessor 130, the substance detector 105, the notification device 110, and the user interface 115, can all include suitable circuitry for permitting wireless communication between each of these components. In this arrangement, these components can communicate with each other over a wireless communication link 135. The wireless communication link 125 and the wireless communication link 135 can use any suitable radio frequency (RF) for the transmission of data. As defined herein, RF means any electromagnetic wave that can be propagated wirelessly through a suitable medium.

In operation, a user can provide a sample to the substance detector 105. The sample can be any specimen that permits the substance detector 105 to generate an impairment reading. Suitable examples include a breath sample, a urine sample, or a blood sample. The substance detector 105 can transmit the impairment reading to the central microprocessor 130 over the control and data interface or the wireless communication link 135. The central microprocessor 130 can perform a variety unctions based on the impairment reading, a number of which will be discussed below.

The impairment reading generated by the substance detector 105 can either be outside or inside the predetermined range for any given sample provided by the user. For example, the predetermined range of the sample provided by the user can conform to the blood alcohol content legal limit within a particular jurisdiction. Therefore, if the level of a substance, i.e., alcohol, ingested by a user is above that jurisdiction's legal limit, the impairment reading will be outside the predetermined range. Alternatively, if the level of the substance ingested by a user is less than or equal to a jurisdiction's legal limit for that substance, the impairment reading will be inside the predetermined range. However, the invention is not limited to having a predetermined range that reflects a jurisdictional legal limit for a particular substance as a predetermined range can be established for any suitable sample provided by a user.

Returning to the operation of the system 100, if the impairment reading is outside the predetermined range, the central microprocessor 130 can signal the notification device 110 over the control and data interface or the wireless communication link 135. In turn, the notification device 110 can contact the transportation service 120 over the wireless communication link 125 thereby providing the navigational data to the transportation service 120.

In one arrangement, the system 100 can be contained within a vehicle driven by the user. In this arrangement, when the notification device 110 contacts the transportation service 120 and provides navigational data, the navigational data permits the transportation service 120 to locate the vehicle driven by the user and, therefore, the user. The transportation service 120 can provide the user with transportation to a desired location. The transportation service 120 can also provide transportation to the vehicle driven by the user. For example, the transportation service 120 can be a towing service 145 that can tow the vehicle driven by the user to a desired location and can also transport the user.

Although the system 100 can be contained within a vehicle driven by the user, the system 100 can function independently of a vehicle. Therefore, the navigational data transmitted from the notification device 110 to the transportation service 120 can permit the transportation service to locate the system 100 and, therefore, the user without any relation to the location of a vehicle. Once the transportation service 120 locates the user, the transportation service 120 can provide the user with transportation. For example, the transportation service 120 can be a driving service 150, such as a taxi service or limousine service.

Figure 2:
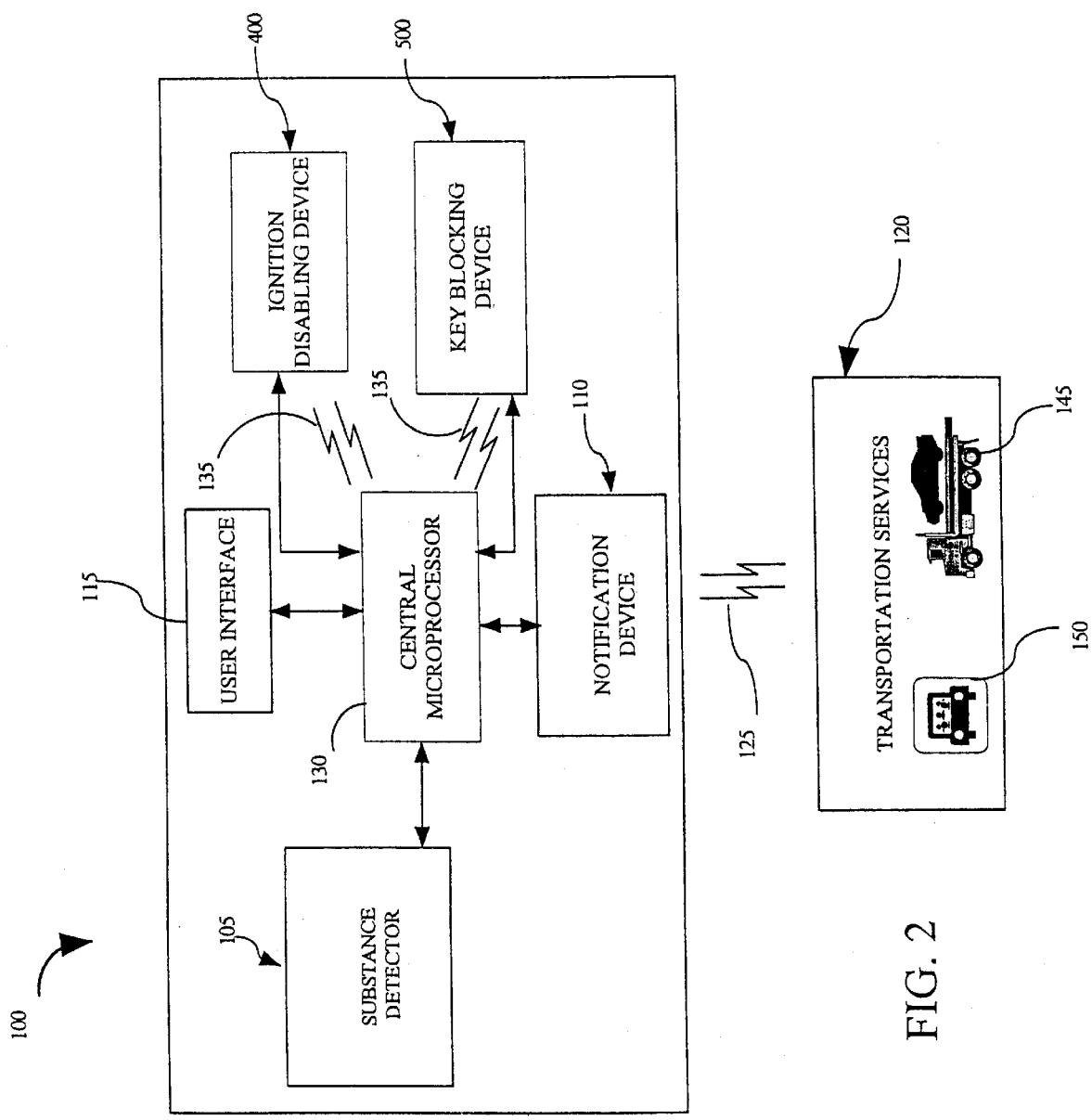
FIG. 2 illustrates another embodiment of a system for providing assistance to impaired drivers in accordance with the inventive arrangements.

In one embodiment and as illustrated in FIG. 2, the system 100 can also include an ignition disabling device 400 and a key blocking device 500. The system 100 can include control and data interfaces for coupling the ignition disabling device 400 and the key blocking device 500 to the central microprocessor 130. In another arrangement, the ignition disabling device 400, the key blocking device 500, and the central microprocessor 130 can include suitable circuitry for permitting wireless communication between each of these components over a wireless communication link 135. The central microprocessor 130 can signal the ignition disabling device 400 and the key blocking device 500 based on impairment readings generated by the substance detector 105.

The ignition disabling device 400 can be used to selectively enable an ignition system based on impairment readings generated by the substance detector 105. In particular, the ignition disabling device 400 can disable an ignition system, necessitating a signal from the central microprocessor 130 to enable the ignition system. If the impairment reading generated by the substance detector 105 is inside a predetermined range indicating that the user is not impaired, the central microprocessor 130 can signal the ignition disabling device 400 to enable the ignition system, thereby allowing the user to operate the ignition system.

Conversely, the ignition system can also remain disabled and prevent an impaired user from operating the ignition system. For example, if the impairment reading generated by the substance detector 105 is outside a predetermined range indicating that the user is impaired, the ignition disabling device 400 will not enable the ignition system, thereby preventing the impaired user from operating the ignition system. The invention is not limited in this regard, however, as the ignition disabling device 400 can also receive signals from the central microprocessor 130 to disable the ignition system based on an impairment reading generated by the substance detector 105. The process of how the ignition disabling device 400 can enable and disable an ignition system will be discussed later.

The key blocking device 500 can provide access to a key based on impairment readings produced by the substance detector 105. As an example, the key blocking device 500 can store, i.e., deny access to a key, necessitating a signal from the central microprocessor 130 to provide access to the key. If the central microprocessor 130 signals that the impairment reading is inside a predetermined range indicating that the user is not impaired, the key blocking device 500 can provide access to the key. One the other hand, if the central microprocessor 130 signals that the impairment reading is outside a predetermined range indicating that the user is impaired, the key blocking device 500 will not provide access to the key. Without access to the key, the key blocking device 500 can prevent the impaired user from engaging the ignition system with the key and, ultimately, stop the impaired user from operating a vehicle. This process of selectively providing access to a key will be discussed later.

Figure 3:
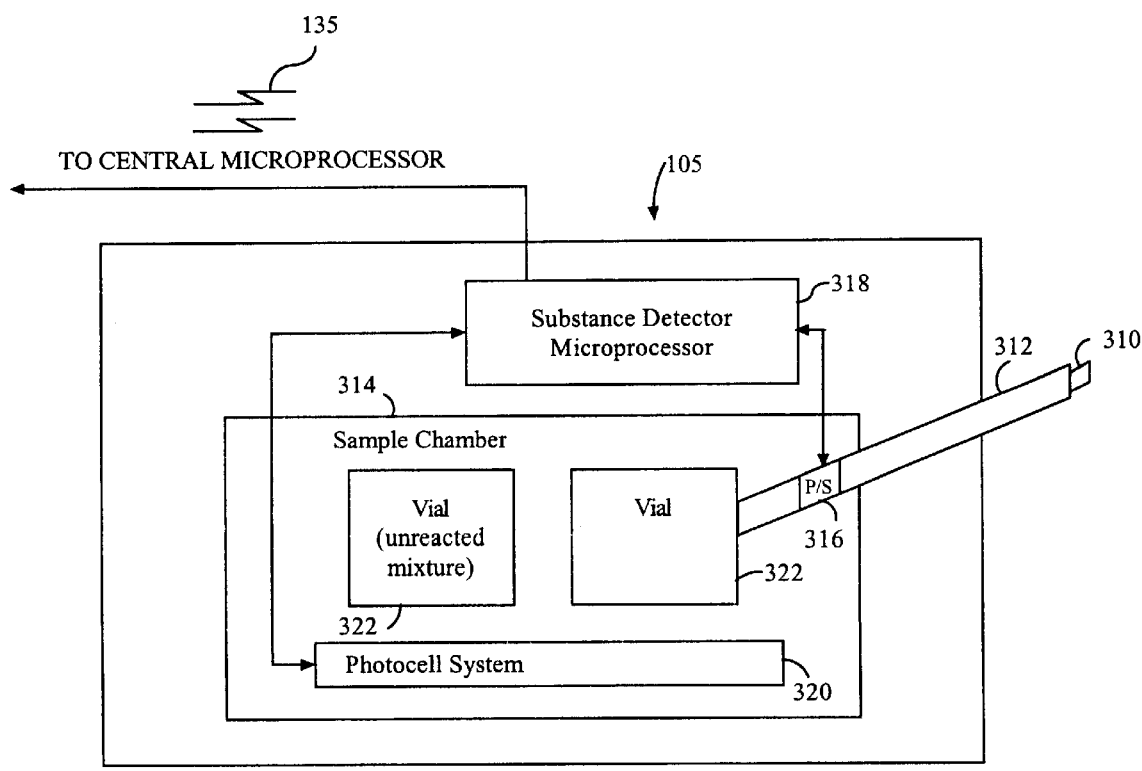
FIG. 3 illustrates a substance detector in accordance with the inventive arrangements.

Turning to FIG. 3, an example of the substance detector 105 in accordance with the inventive arrangements is shown. In this example, the substance detector 105 can be a breath alcohol test device commonly referred to as a Breathalyzer. Such a device relies on chemical reactions involving alcohol to determine a user's blood alcohol content. The substance detector 105 can include a mouthpiece 310, a tube 312, a sample chamber 314, a pressure switch 316, a sobriety detector microprocessor 318, a photocell system 320 and a plurality of vials 322 for storing the chemicals used in the breath analysis. The tube 312 can be attached to the mouthpiece 310 and can channel exhaled air from a user to the sample chamber 314. To prevent the spread of communicable diseases and to ensure overall sanitary conditions, the mouthpiece 310 can be a disposable elongated tube that can be conveniently discarded following its use, such as a plastic straw.

Additionally, the photocell system 320 and the vials 322 can be contained within the sample chamber 314, and the pressure switch 316 can be located within the tube 312. In one arrangement, the pressure switch 316 can be designed to close electrically when the air pressure at its input reaches a predetermined threshold. The substance detector microprocessor 318 can control the operation of the photocell system 320 and can receive signals from the pressure switch 316. The substance detector microprocessor 318 can also receive signals from and transmit signals to the central microprocessor 130 via control and data interfaces. In another arrangement, the substance detector microprocessor 318 can include suitable circuitry to permit it to communicate with the central microprocessor 130 over a wireless communication link 135. The substance detector microprocessor 318 can also receive signals from and transmit signals to the notification device 110, the user interface 115, the ignition disabling device 400, and the key blocking device 500 via control and data interfaces or via the wireless communication link 135.

As the user's breath passes through the tube 312, the air pressure at the input of the pressure switch 316 will increase. If the pressure reaches the predetermined threshold, the pressure switch 316 can electrically close thereby signaling the substance detector microprocessor 318 that an acceptable breath sample has been received. If the substance detector microprocessor 318 receives no signal from the pressure switch 316 within a predetermined amount of time, the substance detector microprocessor 318 can signal the central microprocessor 130. In response, the central microprocessor 130 can prompt the user interface 115 to provide operating information and request the user to provide another breath sample. After the substance detector microprocessor 318 receives the signal from the pressure switch 316, the substance detector microprocessor 318 can signal the photocell system 320.

The breath sample can enter the sample chamber 314 and can be bubbled through a chemical mixture in at least one of the vials 322 thereby causing a chemical reaction. As an example, the breath sample can be bubbled through a mixture including sulfuric acid, potassium dichromate, silver nitrate and water. By products of this reaction include chromium sulfate, potassium sulfate and acetic acid. During this reaction, reddish-orange dichromate ions change color to the green chromium ions when they react with alcohol present in the breath sample. The degree of this color change is directly related to the level of alcohol in the expelled air.

The photocell system 320 can compare the vial 322 containing the reacted mixture to a vial 322 containing an unreacted mixture. Based on the difference in color between the two mixtures, the photocell system 320 can generate an electrical signal and can transmit the signal to the substance detector microprocessor 318. The substance detector microprocessor 318 can produce a blood alcohol content reading based on the electrical signal and can forward the reading to the central microprocessor 130.

Those of ordinary skill in the art; however, will appreciate that the substance detector 105 can include different components and can utilize different methods to detect the presence and concentration of a variety of substances ingested by a user. For example, the substance detector 105 can employ infrared spectroscopy, commonly used in Intoxilyzers, to detect a substance ingested by a user. Therefore, the example above is only illustrative, and the invention is not limited to such a substance detector 105, as any suitable substance detector may be used with the invention.

Figure 4:
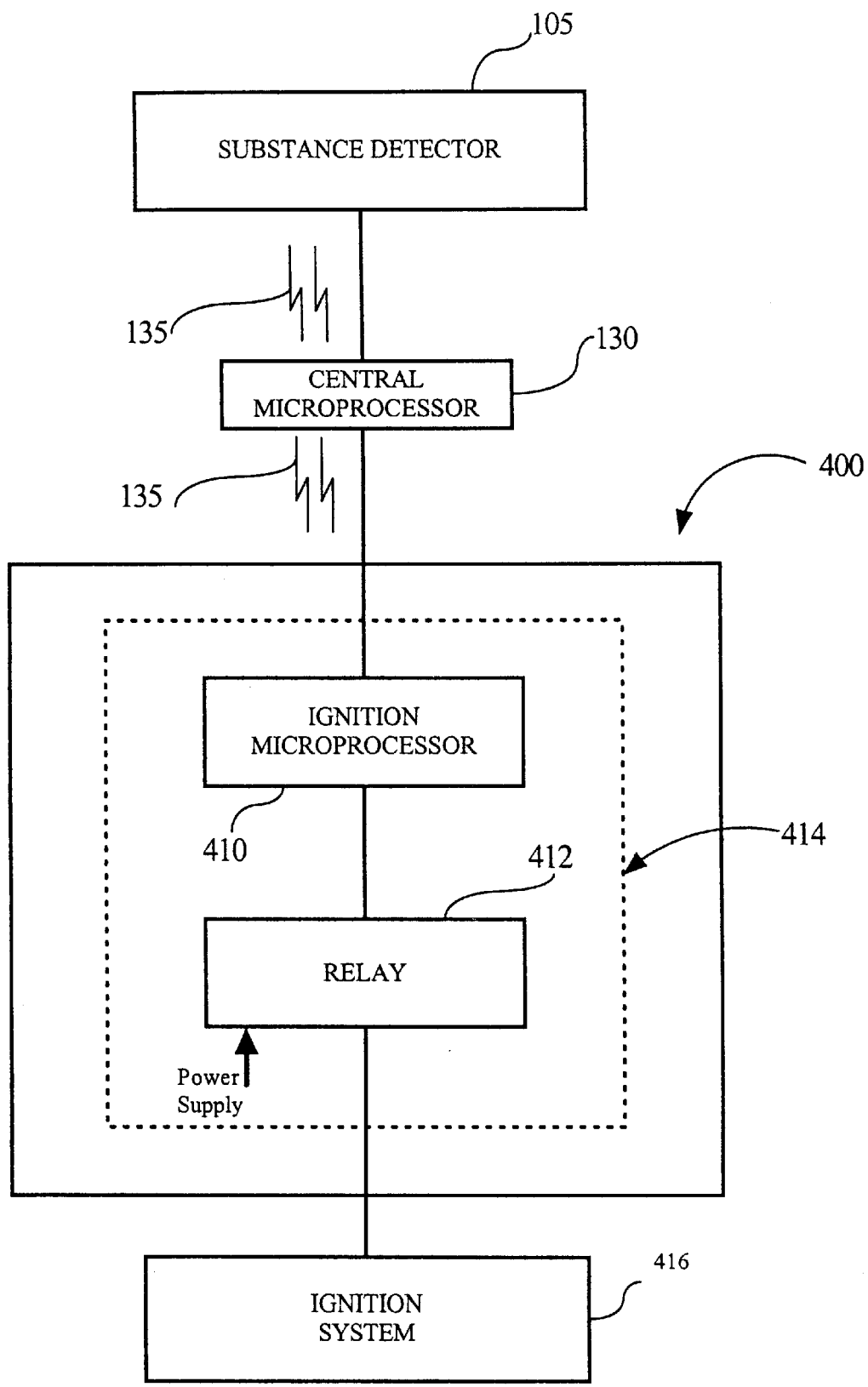
FIG. 4 illustrates an ignition disabling device in accordance with the inventive arrangements.

Turning to FIG. 4, an example of an ignition disabling device 400 in accordance with the inventive arrangements is shown. The ignition disabling device 400 can include an ignition microprocessor 410 and a relay 412. The relay 412 can be coupled to a power supply and can switchably control the transmission of power to an ignition system 416. Thus, the ignition microprocessor 410 and the relay 412 can form a circuit 414 that can supply power to the ignition system 416. As an example, the ignition disabling device 400 can be part of a vehicle (not shown) and the ignition system 416 can be a vehicle ignition system. It would be obvious to one skilled in the art that the ignition disabling device 400 can be connected to a variety of components, such as a spark plug. The ignition microprocessor 410 can be in communication with the central microprocessor 130 via control and data interfaces. In another arrangement, the ignition microprocessor 410 can include suitable circuitry to permit it to communicate with the central microprocessor 130 over a wireless communication link 135. The ignition microprocessor 410 can control the switchable relay 412 to open or close the circuit 414 based on signals received from the central microprocessor 130.

For example, if the substance detector 105 generates an impairment reading that is inside a predetermined range indicating that the user is not impaired, the central microprocessor 130 can signal the ignition microprocessor 410. In response, the ignition microprocessor 410 can instruct the relay 412 to close the circuit 414, thereby enabling the ignition system 416. Conversely, if the substance detector 105 generates an impairment reading that is outside a predetermined range indicating that the user is impaired, the central microprocessor 130 can signal the ignition microprocessor 410. After receiving a signal from the central microprocessor 130, the ignition microprocessor 410 can instruct the relay 412 to open the circuit 414, which disables the ignition system 416 and prevents the impaired user from operating the vehicle. Alternatively, the circuit 414 can contain a default position in which the relay 412 opens the circuit 414 once the ignition system 416 is shut off. Thus, the ignition system 416 may be previously disabled, and the ignition disabling device 400 can enable the ignition system 416 upon receiving an authorizing signal from the central microprocessor 130. The authorizing signal can be transmitted if the impairment reading generated by the substance detector 105 is within the predetermined range.

Figure 5A:
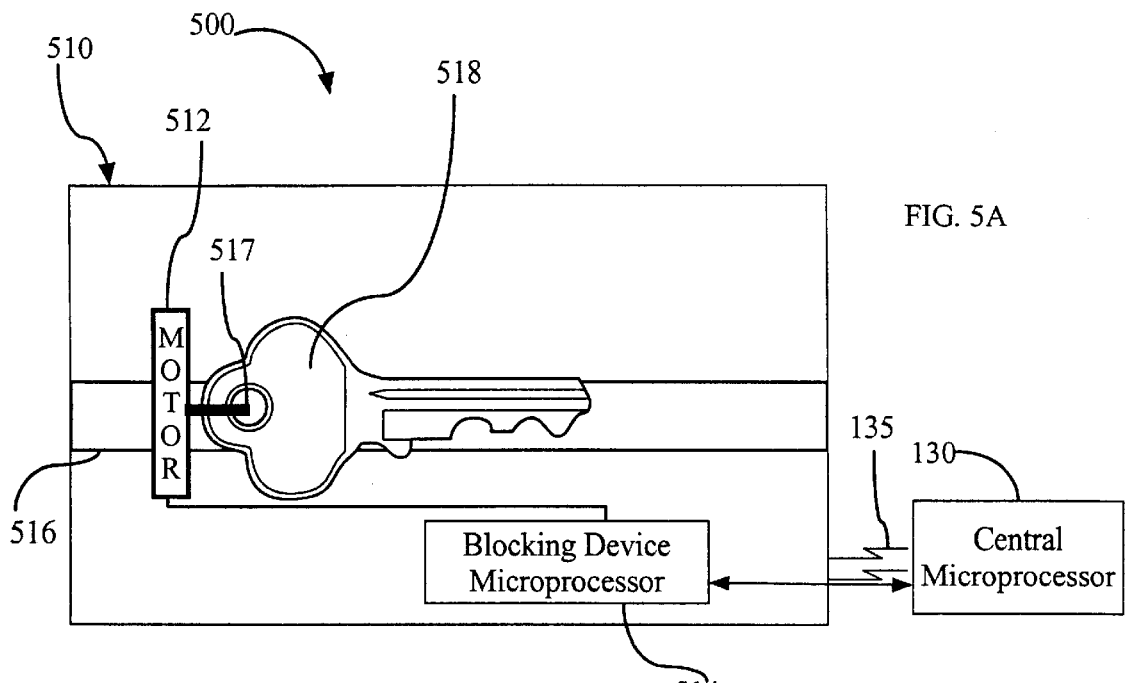
FIG. 5A illustrates a key blocking device in which access to a key is not provided in accordance with the inventive arrangements.
Figure 5B:
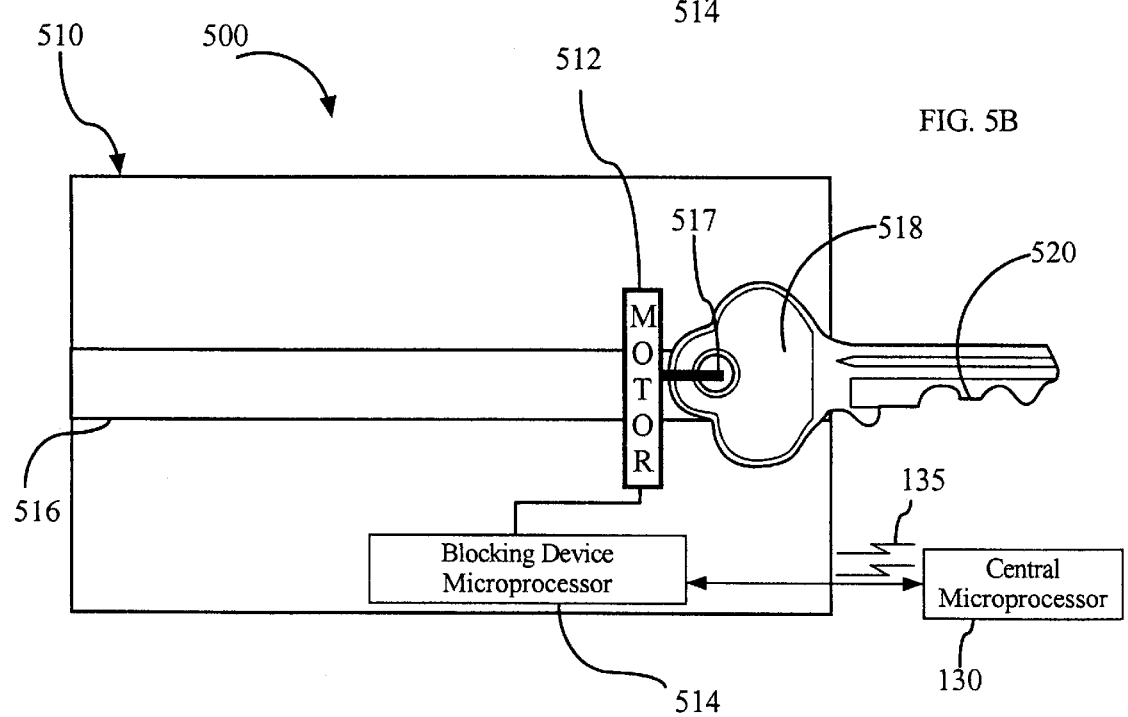
FIG. 5B illustrates a key blocking device in which access to a key is provided in accordance with the inventive arrangements.

Turning to FIGS. 5A and 5B, an example of a key blocking device 500 in accordance with the inventive arrangements is shown. In this embodiment, the key blocking device 500 can include a blocking device 510, one or more motors 512, a blocking device microprocessor 514, one or more tracks 516 which can run substantially along the length of the blocking device 510, and a coupling mechanism 517. A key 518 can be slidably engaged to one or more of the tracks 516. The blocking device microprocessor 514 can be coupled to the motor 512, the coupling mechanism 517, and the central microprocessor 130 through control and data interfaces; the blocking device microprocessor 514 can also be provided with suitable circuitry to allow wireless communication over a wireless communication link 135 with the central microprocessor 130.

The key blocking device 510 can disable the key 518 when a user forces a portion of the key 518 to contact the coupling mechanism 517. Sensing contact with the key 518, the blocking device microprocessor 514 can instruct the coupling mechanism 517 to secure the key 518, as shown in FIG. 5B. The coupling mechanism 517 can be, for example, a solenoid operated snap or clamp; however, the invention is not limited in this regard as any suitable coupling mechanism 517 can be used. Once the coupling mechanism 517 has secured the key 518, the blocking device microprocessor 514 can signal the motor 512 to impart motion to the key 518. The motor 512 can force the key 518 to retract along the tracks 516 until access to at least a portion of a functional region 520 of the key 518 is removed. This process can disable the key 518 as shown in FIG. 5A. For purposes of this invention, the term "functional region" can include that portion of a key used to engage, for example, a lock or an ignition system.

In operation, an impairment reading generated by the substance detector 105 can be signaled to the blocking device microprocessor 514 through the central microprocessor 130. If the impairment reading is inside a predetermined range indicating the user is not impaired, the key blocking device 500 can provide access to the key 518. As shown in FIG. 5B, the blocking device microprocessor 514 can instruct the motor 512 to impart motion to the key 518 causing the key 518 to slide along the track 516 until at least a portion of the functional region 520 of the key 518 is exposed, thereby providing access to the key 518. Alternatively, as shown in FIG. 5A, if the, impairment reading is outside a predetermined range, the key blocking device 500 can prevent access to the key 518 by not allowing the exposure of the functional region 520 of the key 518.

Figure 6:
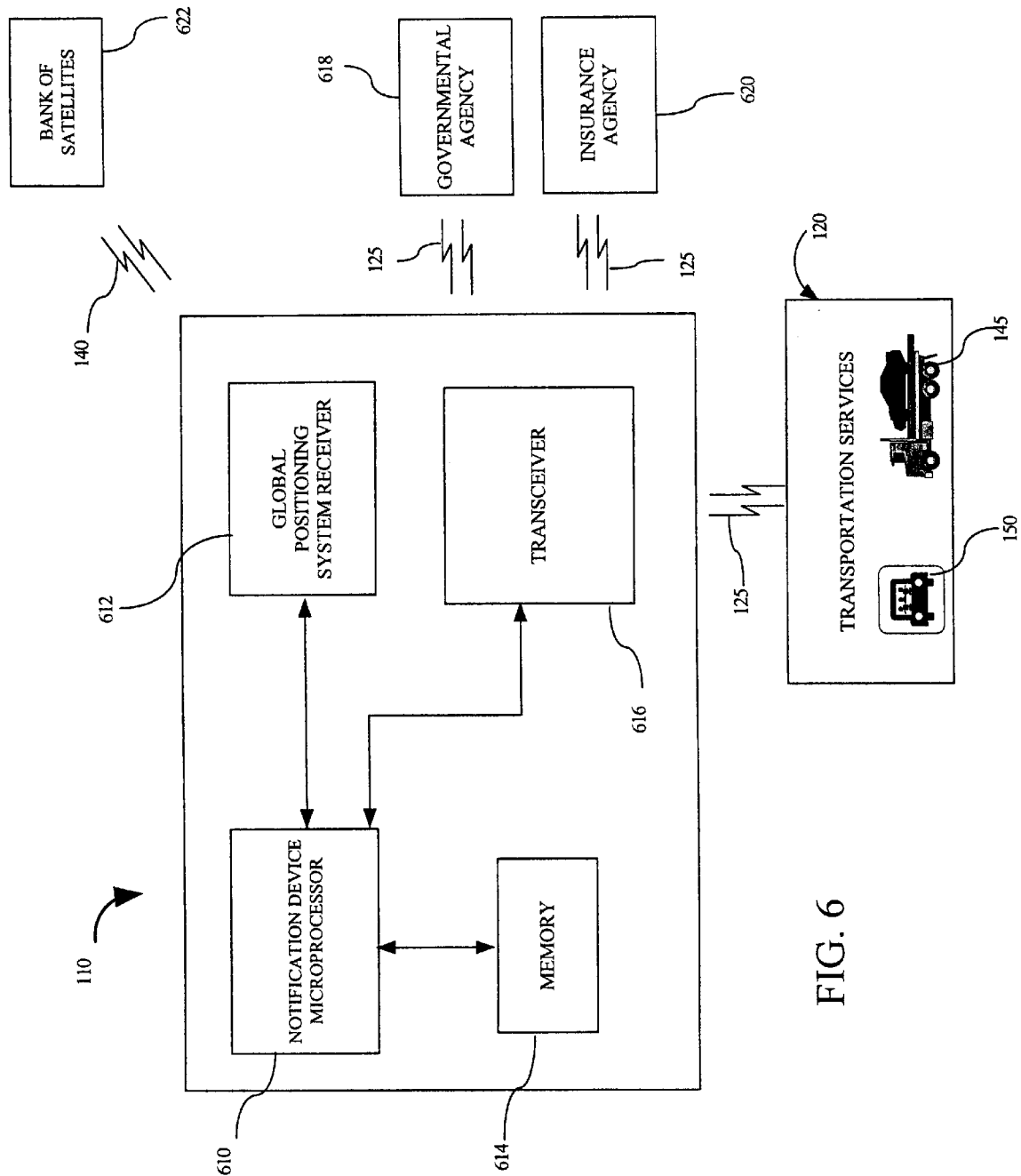
FIG. 6 illustrates a notification device in accordance with the inventive arrangements.

Turning to FIG. 6, an example of a notification device 110 in accordance with the inventive arrangements is shown. The notification device 110 can include a notification device microprocessor 610, a global positioning system receiver 612, memory 614, and a transceiver 616. The global positioning system receiver 612 can receive navigational data, and the transceiver 616 can transmit the navigational data and identifying information stored in memory 614. For example, the identifying information can include the user's name, social security number, home address, credit card information, prior driving under the influence offense record, or any other relevant information. As explained earlier, the notification device 110 can contact the transportation service 120, when the substance detector 105 generates an impairment reading that is outside a predetermined range. In another embodiment, the notification device can also contact a governmental agency 618 and/or an insurance agency 620 when the impairment reading is outside the predetermined range. As an example, the governmental agency 618 cam be a police station or an agency overseeing a user's probationary period.

The global positioning system receiver 612 can be any communications system having suitable circuitry for sending signals and receiving signals from at least one satellite 622. The global positioning system receiver 612 can use any suitable RF standard to transmit and receive signals over a wireless communications link 140. The global positioning system receiver 612 can transfer data obtained from the at least one satellite 622 to the notification device microprocessor 610.

Preferably, the global positioning system receiver 612 can communicate with at least three satellites 622 and can transfer the amount of time to send and receive signals with each satellite to the notification device microprocessor 610.

Accordingly, the global positioning system receiver 612 can have a timing device (not shown), such as a quartz clock, that can be approximately synchronized with timing devices contained in the satellites 622. The notification device microprocessor 610, programmed with the propagation speed of the signals sent and received, can compute the distance from the user to each satellite 622 using the time at which a signal was sent and received. Using geometric principles as known in the art, the notification device microprocessor 610 can triangulate the location of the user which can be transferred as navigational data to different entities via the transceiver 616.

The transceiver 616 can be any communications system having suitable circuitry for contacting one or more entities. As an example, the transceiver 616 can be a standard telephone system that can transmit and receive telephone signals over the primary switching telephone network (PSTN) (not pictured). Alternatively, the transceiver 616 can be a wireless communications system capable of transmitting and receiving signals over a wireless communications link 125. Any suitable RF standard can be used to transmit signals over the wireless communications link 125. In another arrangement, the transceiver 616 can include a modem for transmitting and receiving data over a communications network such as the Internet.

In either embodiment, the transceiver 616 can transmit a service signal to a receiving entity such as a transportation service 120, a governmental agency 618, and/or an insurance agency 620. This transmittal signal can include navigational data for locating the system 100, identifying information, and also, a prerecorded message informing the transportation service 120 that a user of the system 100 needs assistance. The prerecorded message can be an audio recording stored in memory 614 and can be capable of being received by the transportation service 120. Alternatively, the prerecorded message can be a visual message capable of being displayed by a monitor. The transportation service 120 can use the identifying information to automatically charge with a fee to an account. For purposes of this invention, the account can be a pre-established account with the transportation service 120, the user's credit card account, or any other account capable of being charged a fee. For example, when the transportation service 120 receives a signal that an impaired driver needs assistance, the transportation service 120 can automatically charge a fee to that user's account obviating the need for the user to pay the transportation service 120 in person and preventing the impaired user from attempting to negotiate a different price.

Referring again to FIG. 1, as noted earlier, the system 100 can also include a user interface 115. The user interface 115 can include a liquid crystal display (not shown); however, the invention is not limited in this regard as other display devices can be used. The user interface 115 can display the impairment reading, operating information, or a combination thereof. For example, the user interface 115 can display a blood alcohol content reading, a warning message, location information, or instructions, such as a request to provide a sample to the substance detector 105. The invention, however, is not limited in this regard as any suitable information can be displayed.

Although the present invention has been described in conjunction with the embodiments disclosed herein, it should be understood that the foregoing description is intended to illustrate and not limit the scope of the invention as defined by the claims.

What is claimed is:

1. A system for providing assistance to impaired drivers, comprising:

a substance detector for generating an impairment reading for a user based on a sample provided by the user; and a notification device in communication with a transportation service;

wherein said notification device contacts the transportation service when said impairment reading is outside a predetermined range;

wherein said notification device provides the transportation service with navigational data when said notification device contacts the transportation service to permit the transportation service to locate the user.

2. The system according to claim 1, wherein said impairment reading is a blood alcohol content reading.

3. The system according to claim 1, further comprising an ignition disabling device, wherein said ignition disabling device enables an ignition system when said impairment reading is inside the predetermined range.

4. The system according to claim 1, further comprising a key blocking device, wherein said key blocking device provides access to a key when said impairment reading is inside the predetermined range.

5. The system according to claim 1, wherein said notification device comprises a global positioning system receiver for providing the navigational data to the transportation service and a transceiver for communicating with the transportation service.

6. The system according to claim 1, wherein said notification device further contacts at least one of a governmental agency and an insurance agency when said impairment reading is outside the predetermined range.

7. The system according to claim 1, wherein the transportation service provides the user with transportation once the transportation service locates the user.

8. The system according to claim 7, wherein the notification device further provides the transportation service with identifying information and the transportation service automatically charges a fee to an account.

9. The system according to claim 1, wherein the system is contained within a vehicle driven by the user and the transportation service locates the user by locating the vehicle, wherein the transportation service provides transportation to the vehicle.

10. The system according to claim 9, wherein the notification device further provides the transportation service with identifying information and the transportation service automatically charges a fee to an account.

11. The system according to claim 1, wherein the transportation service comprises at least one of a driving service and a towing service.

12. The system according to claim 1, further comprising a user interface, wherein said user interface displays at least one of operating information and said impairment reading.

13. A method for providing assistance to impaired drivers, said method comprising the steps of:

generating an impairment reading for a user based on a sample provided by the user;

contacting a transportation service when the impairment reading is outside a predetermined range; and providing the transportation service with navigational data during said contacting step to permit the transportation service to locate the user.

14. The method according to claim 13, further comprising the step of providing transportation to at least one of the user and a vehicle driven by the user.

15. The method according to claim 13, wherein the impairment reading is a blood alcohol content reading.

16. The method according to claim 13, further comprising the steps of:
  providing an ignition disabling device; and
  enabling an ignition system with the ignition disabling device when the impairment reading is within the predetermined range.

17. The method according to claim 13, further comprising the step of:
  providing a key blocking device; and
  enabling a key with the key blocking device when the impairment reading is within the predetermined range.

18. The method according to claim 13, wherein said contacting step further comprises the step of contacting at least one of a governmental agency and an insurance agency when the impairment reading is outside the predetermined range.

19. The method according to claim 13, wherein said providing step further comprises the step providing the transportation service with identifying information;
  wherein the transportation service automatically charges a fee to an account.

* * * * *